(12) United States Patent
Green et al.

(10) Patent No.: US 9,444,848 B2
(45) Date of Patent: Sep. 13, 2016

(54) CONDITIONAL ACCESS TO SERVICES BASED ON DEVICE CLAIMS

(71) Applicant: Microsoft Technology Licensing, LLC, Redmond, WA (US)

(72) Inventors: Christopher Samuel Green, Redmond, WA (US); Farhan Haleem Qureshi, Redmond, WA (US); Sucharit SenGupta, Redmond, WA (US); Nirmal Rajesh Soy, Bellevue, WA (US); Michael J. Healy, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 46 days.

(21) Appl. No.: 14/491,819

(22) Filed: Sep. 19, 2014

(65) Prior Publication Data

US 2016/0088017 A1    Mar. 24, 2016

(51) Int. Cl.
| | | |
|---|---|---|
| G06F 17/00 | (2006.01) | |
| H04L 29/06 | (2006.01) | |
| G06F 21/41 | (2013.01) | |

(52) U.S. Cl.
CPC ............ *H04L 63/20* (2013.01); *G06F 21/41* (2013.01); *H04L 63/08* (2013.01); *H04L 63/0815* (2013.01)

(58) Field of Classification Search
CPC ... H04L 63/20; H04L 63/08; H04L 63/0815; G06F 21/41; G06F 21/6218
USPC ................................ 726/1, 3, 6, 9; 709/224
See application file for complete search history.

(56) References Cited

U.S. PATENT DOCUMENTS

| | | | | |
|---|---|---|---|---|
| 5,544,322 | A | * | 8/1996 | Cheng ................ H04L 63/0807 340/5.8 |
| 7,437,441 | B1 | * | 10/2008 | Drew .................... H04L 41/082 370/395.21 |
| 7,827,545 | B2 | | 11/2010 | Choe et al. |
| 8,418,238 | B2 | | 4/2013 | Platt et al. |
| 8,521,829 | B2 | | 8/2013 | Kohavi |

(Continued)

FOREIGN PATENT DOCUMENTS

| | | | | |
|---|---|---|---|---|
| EP | | 1841174 A1 | * 10/2007 | ............ G06F 21/31 |
| WO | WO2016044500 A1 | * | 3/2016 | |

OTHER PUBLICATIONS

Dalton, "Exploiting the Network for Securing Personal Devices", CSP Forum 2014, CCIS 470, Springer International Publishing Switzerland, pp. 16-27, 2014.*

(Continued)

*Primary Examiner* — Andrew Nalven
*Assistant Examiner* — Walter Malinowski
(74) *Attorney, Agent, or Firm* — Kate Drakos; Raghu Chinagudabha; Micky Minhas (57) ABSTRACT

Providing access to one or more resources to a user device. A method includes at a user device, registering with an identity service to obtain an identity credential. The method further includes at the user device, registering with a policy management service by presenting the identity credential. The method further includes at the user device, providing an indication of current state of the user device to the policy management service. The policy management service can then indicate to the identity service the compliance level of the user device. The method further includes the user device receiving a token from the identity service based on the policy management level of the user device as compared to a policy set.

20 Claims, 4 Drawing Sheets

(56) References Cited

U.S. PATENT DOCUMENTS

| | | | | |
|---|---|---|---|---|
| 8,682,802 | B1* | 3/2014 | Kannanari | G06Q 20/3274 705/64 |
| 8,726,343 | B1* | 5/2014 | Borzycki | G06F 21/6218 709/203 |
| 2005/0193093 | A1* | 9/2005 | Mathew | G06Q 30/02 709/219 |
| 2006/0026671 | A1* | 2/2006 | Potter | H04L 63/08 726/7 |
| 2007/0150934 | A1* | 6/2007 | Fiszman | H04L 63/102 726/1 |
| 2007/0169171 | A1* | 7/2007 | Kumar | H04L 63/08 726/2 |
| 2007/0179802 | A1* | 8/2007 | Buss | G06Q 10/00 726/4 |
| 2007/0234408 | A1* | 10/2007 | Burch | G06F 21/31 726/6 |
| 2008/0184339 | A1* | 7/2008 | Shewchuk | G06F 21/33 726/3 |
| 2008/0229383 | A1* | 9/2008 | Buss | G06F 21/41 726/1 |
| 2008/0289020 | A1* | 11/2008 | Cameron | H04L 63/0861 726/9 |
| 2009/0086740 | A1* | 4/2009 | Al-Bakri | H04L 65/1016 370/401 |
| 2009/0300512 | A1* | 12/2009 | Ahn | G06F 21/34 715/747 |
| 2009/0300747 | A1* | 12/2009 | Ahn | G06F 21/34 726/9 |
| 2010/0088519 | A1* | 4/2010 | Tsuruoka | G06F 21/33 713/176 |
| 2011/0119729 | A1* | 5/2011 | Bergeson | G06F 9/5061 726/1 |
| 2011/0125894 | A1* | 5/2011 | Anderson | H04L 9/3213 709/224 |
| 2011/0296486 | A1* | 12/2011 | Burch | H04L 67/38 726/1 |
| 2012/0066502 | A1* | 3/2012 | Borneman | G06F 21/41 713/176 |
| 2012/0246695 | A1 | 9/2012 | Cameron | |
| 2012/0331518 | A1* | 12/2012 | Lee | G06F 21/33 726/1 |
| 2013/0086639 | A1* | 4/2013 | Sondhi | H04L 63/0815 726/4 |
| 2013/0111592 | A1* | 5/2013 | Zhu | G06F 21/577 726/25 |
| 2013/0191884 | A1* | 7/2013 | Leicher | H04L 63/08 726/4 |
| 2013/0254889 | A1* | 9/2013 | Stuntebeck | G06F 21/562 726/23 |
| 2014/0020072 | A1* | 1/2014 | Thomas | H04L 63/0815 726/7 |
| 2014/0040979 | A1* | 2/2014 | Barton | H04L 63/20 726/1 |
| 2014/0122873 | A1* | 5/2014 | Deutsch | H04L 63/20 713/158 |
| 2014/0211242 | A1* | 7/2014 | Stone | G06F 3/1222 358/1.15 |
| 2014/0281508 | A1* | 9/2014 | Akhter | H04L 9/0833 713/162 |
| 2015/0019703 | A1* | 1/2015 | Ludwig | H04W 12/02 709/223 |
| 2015/0019746 | A1* | 1/2015 | Shatzkamer | H04L 65/1069 709/228 |
| 2015/0113618 | A1* | 4/2015 | Sinha | G06F 21/44 726/6 |
| 2015/0135257 | A1* | 5/2015 | Shah | H04L 63/08 726/1 |

OTHER PUBLICATIONS

"Secure Access to Company Resources from Any Location on Any Device", Published on: Jan. 15, 2014 Available at: http://technet.microsoft.com/en-us/library/dn550982.aspx.

"Effective Identity and Access Management in a Mobile World", In White Papers, Retrieved on: Jul. 4, 2014, 5 pages.

"Easy to use, Flexible Guest Access Simplified BYOD On-Boarding and Policy Management", Retrieved on: Jul. 4, 2014 Available at: http://www.merunetworks.com/collateral/data-sheets/identity-manager-idm-for-wireless-lan-ds.pdf.

"Oracle Mobile and Social Access Management", In Oracle White Paper, May 2013, 25 pages.

Mont, et al., "On Device-based Identity Management in Enterprises", In Technical Report HPL-2007-53, Apr. 18, 2007, 12 pages.

"IBM Endpoint Manager for Mobile Devices", In White Paper of IBM Software, Jun. 28, 2013, 6 pages.

"International Search Report & Written Opinion Issued in PCT Application No. PCT/US2015/050540", Mailed Date: Dec. 3, 2015, 10 Pages.

* cited by examiner

CONDITIONAL ACCESS TO SERVICES BASED ON DEVICE CLAIMS

BACKGROUND

Background and Relevant Art

Handheld mobile computing devices have become ubiquitous. For example, many people have so-called smart phones or tablet computers. Such devices allow users to use cellular data systems or other network systems to access a broad spectrum of services. For example, using such devices, a user can access email, the Internet, on-line databases, etc. People who have personal smart phones (or other smart devices) may often want to use these personal devices to access company resources belonging to the companies by which they are employed.

IT administrators are able today to configure, monitor and evaluate compliance for mobile devices through various policy management systems. They do this to protect corporate services and data. However, one key challenge is how to enforce that devices be managed through a policy management system, or that they be compliant with various policies, before they are allowed to access these resources. Certain solutions that exist today require that a direct connection between a corporate service and the policy management system be established to determine whether the device is managed and compliant before allowing access to the corporate service. However this approach is difficult to scale as more services and client applications are added.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for providing access to one or more resources to a user device. The method includes at a user device, registering with an identity service to obtain an identity credential. The method further includes at the user device, registering with a policy management service by presenting the identity credential. The method further includes at the user device, providing an indication of current state of the user device to the policy management service. The method further includes the user device receiving a token from the identity service based on the policy management level of the user device as compared to a policy set, as the policy management service has provided an indication of compliance with the policy set to the identity service.

Another embodiment includes a method that may be practiced in a computing environment. The method includes acts for providing access to one or more resources to a user device. The method includes, at an identity management service, receiving a registration request from a user device to obtain an identity credential from the identity management service. The method further includes, at the identity management service, receiving an indication from a policy management service whether or not the user device complies with one or more policies by the policy management service using information provided by the device using the identity credential to identify the device to the identity management service. The method further includes, at the identity management service, receiving a request from a service endpoint to verify that the device complies with one or more policies. The method further includes at the identity management service, based on the indication from the policy management service whether or not the user device complies with one or more policies, providing a token, with an indication of the device compliance state with respect to the one or more polices, to the service endpoint.

Another embodiment illustrated herein includes a user device for accessing resources from a service endpoint. The user device includes a client component. The client component is configured to register with an identity service to obtain an identity credential. The client component is further configured to register with a policy management service by presenting the identity credential. The client component is further configured to provide an indication of current state of the user device to the policy management service. The client component is further configured to receive a token response from the identity service based on the compliance level of the user device as compared to a policy set, as the policy management service has provided an indication of compliance with the policy set to the identity service. The user device further includes a client application that is configured to use a token from a token response to attempt to access one or more resources at a service endpoint.

This Summary is provided to introduce a selection of concepts in a simplified form that are further described below in the Detailed Description. This Summary is not intended to identify key features or essential features of the claimed subject matter, nor is it intended, to be used as an aid in determining the scope of the claimed subject matter.

Additional features and advantages will be set forth in the description which follows, and in part will be obvious from the description, or may be learned, by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope, embodiments will be described and explained with additional specificity and detail through the use of the accompanying drawings in which.

DETAILED DESCRIPTION

Some embodiments illustrated herein allow IT administrators to allow and/or block access to services by tracking device state in a common identity management system by way of device claims. In some embodiments, this allows various services and client applications to enable conditional access simply by utilizing the same identity management system and passing the device claim, without any direct connection to the policy management system.

Figure 1:
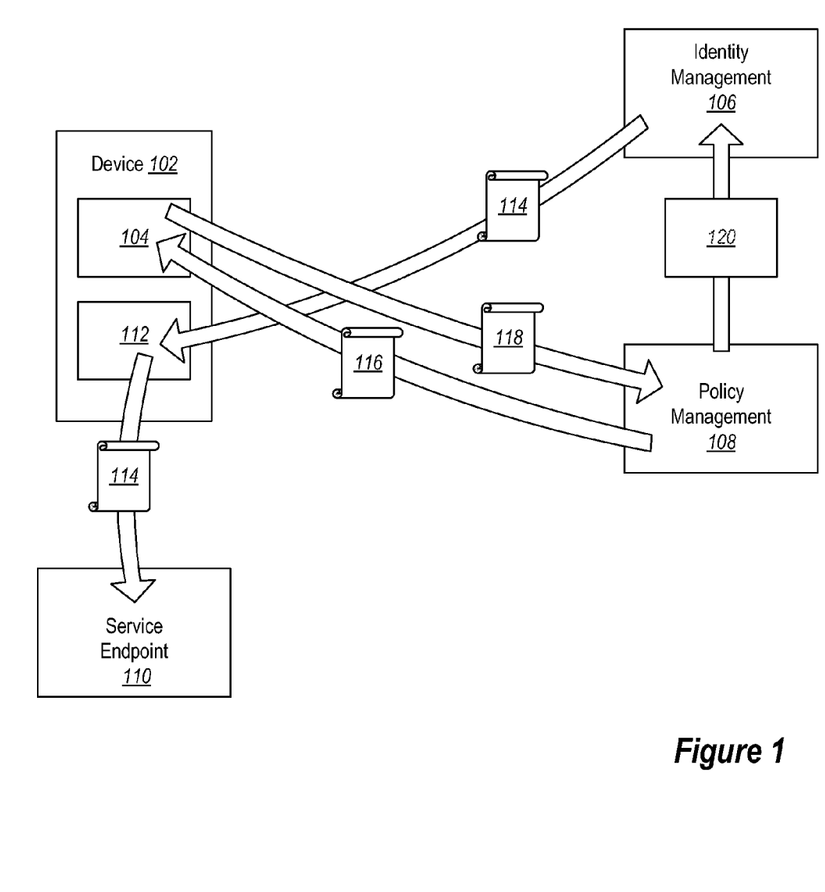
FIG. 1 illustrates interactions between a user device, a service endpoint, an identity management service and a policy management service.

Referring now to FIG. 1, an example topology is illustrated. The topology includes a client device 102. This may be, for example, a client computer, tablet, phone or other device running an operating system capable of running applications and being managed by a policy management system 108.

The client device 102 includes a client component 104. The client component 104 running on the client device 102 interprets, evaluates, and enforces policies sent to it by the policy management system 108.

The topology includes an identity management system 106. The identity management system 106 manages identities of users, devices, and service principals for the purposes of security, authentication and authorization. In some embodiments, the identity management system 106 may be an Active Directory or Azure Active Directory available from Microsoft Corporation of Redmond, Wash.

The topology includes a policy management system 108. The policy management system 108 is the interface used by the IT professional to create, target and deploy policy to identities or accounts within managed applications. In some embodiments, this may be implemented using the Intune service or Configuration Manager available from Microsoft Corporation of Redmond, Wash.

The topology includes one or more service endpoints, such as service endpoint 110. The service endpoint 110 provides services to client applications. Access to client applications should be restricted to only client applications running on devices that are managed and evaluated as compliant by the policy management system 108, although there may be some exceptions to this for some specific users or user groups as will be explained in more detail below. Examples of service endpoints are virtually unlimited, but may include services such as mail services (such as Exchange available from Microsoft Corporation of Redmond, Wash.), data sharing and document management services (Such as SharePoint available from Microsoft Corporation of Redmond, Wash.), time entry and attendance management services, corporate intranets, etc.

The client device 102 may further include one or more client applications, such as client application 112. This may be, for example, a mail client (such as Mobile Outlook Web Access, available from Microsoft Corporation of Redmond, Wash.), or other client application (such as OneDrive For Business, available from Microsoft Corporation of Redmond, Wash.), etc, running on the client device 102.

The following illustrates an example workflow. An IT administrator sets a conditional access policy within the service endpoint 110 or identity management 106 to require that access be restricted to client applications 112 running on devices 102 that are managed and compliant with the policy. Users and devices that are not targeted by this policy are not subjected to conditional access, nor are customers who do not have the policy management system 108.

The IT administrator creates one or more compliance policies that target specific users, user groups, devices, etc. The compliance policy is created and deployed to the policy management service 108.

In one example, a user tries connecting the service endpoint 110 from a client application 112 on a non-managed device 102. After the user authenticates to the identity management system 106, the client application 112 receives a token 114 from the identity management system 106 and passes it to the service endpoint 110. The service endpoint 110 inspects the token for a claim that the client device 102 is managed. The client application 112 fails to authenticate because the claim is not present.

The user is redirected by the service endpoint 110 to the policy management system 108, which guides the user through a process to enroll the client device 102 for management. The policy management system 108 deploys any targeted compliance policy 116 to the client device 102. For example, the targeted compliance policy 116 may deploy policy to the device 102 so that the device 102 will comply with the policy for accessing the service endpoint 110. In some embodiments, this can cause the device 102 to automatically set the state of the device 102 to comply with the policy. In other embodiments, the targeted compliance policy 116 can be presented to a user so that the user can make changes manually to the device 102.

Alternatively, the policy management system 108 may, in addition to guiding the user through an enrollment process, indicate what the user needs to change about the device 102 state to comply with the policy for using the endpoint 110. However, in some embodiments, this may not be performed, or may be performed at a later time.

In some embodiments, rather than forcing client state, the compliance policy 116 may simply request various pieces of state from the client device 102. The request may include a comprehensive list that includes state of interest to the policy set at the policy management system 108 and state that is of little or no interest to the policy set at the policy management system 108. Alternatively, the request may simply be a request for information about state of interest. The request may ask for affirmation that certain state exists at the client device 102 for state of interest to the policy set at the policy management system 108. Alternatively or additionally, the request may simply ask for the state of the client device 102, which can then be later used to determine if the device is in a compliant state for use with the service endpoint 110. For example, policy set at the policy management system 108 may require that any devices using the service endpoint 110 have a password of a certain length. A request in the compliance policy 116 may request an indication of the password protection on the device 102. The device 102 may return an indication that a 4 character pin is in use on the device 102. The policy management system 108 can then determine whether or not the device is within the policy constraints.

The client component 104 interprets and processes the policy 116, which in this example is compliance policy, and returns results 118 of the processing to the policy management system 108. The policy management system 108 summarizes the results 118 and sets the compliance state setting 120 in the identity management system 106. This setting 120 may indicate if the device complies with the policy for accessing the service endpoint 110. Alternatively, if the device 102 does not comply with the policy for accessing the service endpoint 110, the policy management system 108 may not set any state in the identity management system 106. Thus, for example, the policy management system may set state in the identity management system 106 that the device 102 has state that complies with some compliance policy, that the device 102 has state that does not comply with other compliance policy, or not set state in the identity management system 106 at all. In some embodiments, the policy management system 108 may simply indicate a security level in the identity management system

106. The security level can indicate a level of encryption, strength of a password on a device, whether or not the device 102 is jail broken, and/or other information about the device state.

The identity management system 106 can then reissue the token 114 but this time the token 114 will include a device claim indicating that the device 102 is compliant (when the device 102 is, in fact compliant) or a device claim indicating the level of compliance. This is based on the policy management system 108 indicating compliance in one or more settings in the identity management system 106. Alternatively, if the device 102 is still not compliant with the policy for accessing the service endpoint 110, the token may indicate non-compliance. This may be by indicating generally that the device 102 is non-compliant, by not including a claim that the device 102 is compliant, by indicating why the device 102 is non-compliant, etc.

The user tries connecting to the service endpoint 110 from a client application 112. This time, the token 114 issued by the identity management system contains claims denoting that the client device 102 is managed, and whether it is compliant or not.

If the client device 102 is compliant, then the service endpoint provides the requested services if the client device 102 is not compliant, the user is directed to information about compliance violations as well as how to remediate. For example, in some embodiments, the user may be directed again to the policy management system 108 that can identify areas of non-compliance and remedial actions that can be taken. Alternatively, there may be sufficient information in the token 114 for the device 102 to be able to indicate to the user why the device 102 is non-compliant. In yet another alternative embodiment, the identity management system 106 may be able to obtain information from the policy management system 108 that can be passed along to the device 102.

Figure 2:
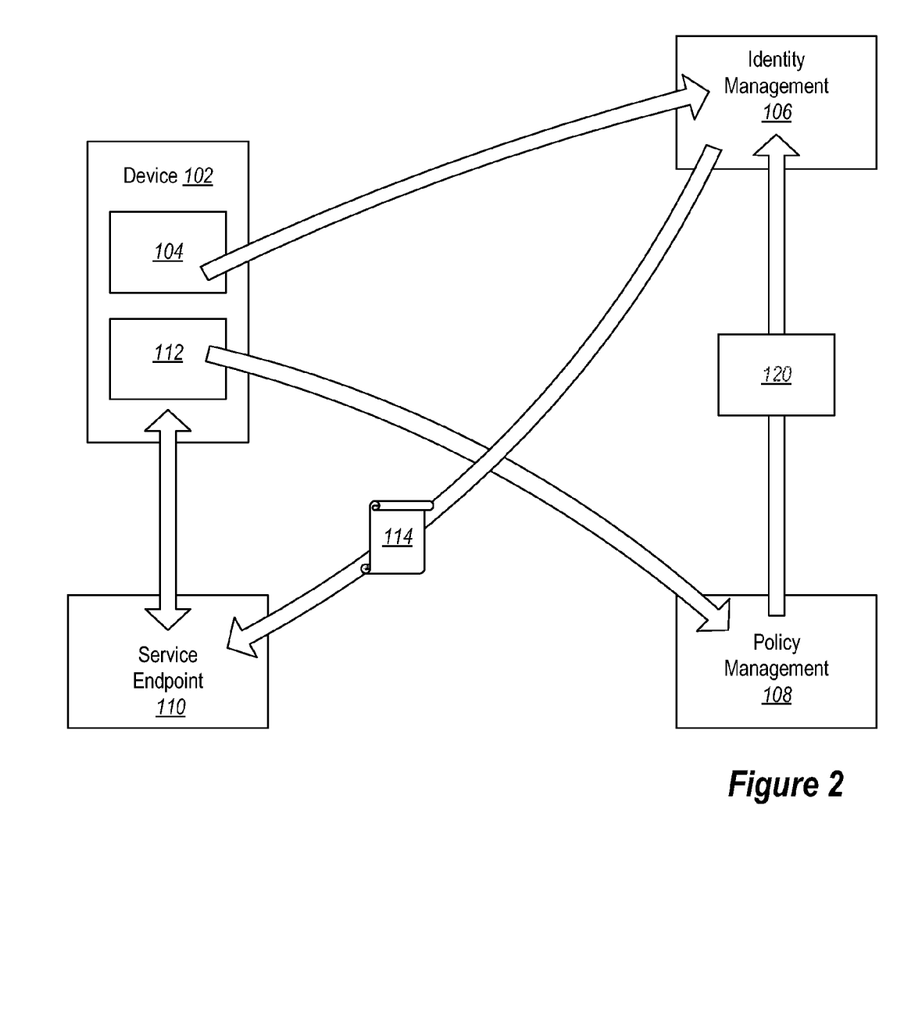
FIG. 2 illustrates another example of interactions between a user device, a service endpoint, an identity management service and a policy management service.

The following illustrates yet another alternative flow with reference to FIG. 2. The IT administrator sets a conditional access policy within the identity management system 106 to require that access be restricted to client applications running on devices that are managed and compliant. The IT administrator sets a compliance policy within the policy management system 108 which specifies that any devices using the service endpoint 110 should comply with these policies. For example, the policies may specify that the device 102 should be protected and encrypted.

The device 102 registers device state with the policy management system 108. The policy management system 108 sets a policy compliance state setting 120 in the identity management system 106. The device 102 attempts to access resources from the service endpoint 110. The service endpoint 110 makes the authentication decision by directly querying for device management and compliance states from the identity management system 106 rather than receiving them from the device 102 itself.

In accordance with the preceding, various characteristics may be exhibited by one or more elements of the topology. In some embodiments, as illustrated above, the policy management system 108 is able to write state, such as device 102 state, into the identity management system 106. This can be performed even when the policy management system 108 and the identity management system 106 are administered anchor owned by different entities. For example, in some embodiments, the policy management system 108 may be able to write a state into an identity management system 106 that denotes whether a client device 102 is managed by the policy management system 108. Alternatively or additionally, in some embodiments, the policy management system 108 is able to summarize compliance against one or more policies and to write this summarized state into the identity management system 106. Alternatively or additionally, in some embodiments, the policy management system 106 is able to set access control rules within the identity management system 106 based on the managed and compliance states of a client device 102. In some embodiments, the policy management system 108 is configured to report the status of compliance rules contributing to summarized compliance state. Thus, the policy management system can identify specific state that causes a device 102 to be out of compliance or specific state that causes a device to be in compliance. This information can be reported to the device 102 itself, the identity management system 106, or other appropriate interested entities.

In sonic embodiments, the policy management system 108 is able to redirect the client device 102. For example, in some embodiments, the policy management service 108 is able to provide an interface to redirect to the client device 102 to participate in an enrollment process. For example, the policy management service 108 may be able to direct the device 102 to the identity management system 106 to cause the device 102 to enroll with the identity management system 106.

Alternatively or additionally, embodiments may be implemented where the policy management system 108 provides an interface to redirect the client device 102 to policy compliance violation and remediation information. For example, the policy management system 108 can redirect the device 102 to the identity management system 106 or another system that can identify to the client what policies the device 102 does not comply with and how the device can make changes to bring the device 102 into compliance.

Embodiments may be implemented where the identity management system 106 includes functionality for storing information about, and performing actions based on a client device's policy compliance. For example, embodiments may be implemented where an identity management system 106 is able to track a state that denotes that a device is managed by a policy management system. Alternatively or additionally, embodiments may be implemented where the identity management system 106 includes functionality for tracking a state that denotes that a device 102 is compliant with policies that have been evaluated by a policy management system 108. Alternatively or additionally, embodiments may be implemented where the identity management system 106 includes functionality for issuing device claims (such as in a token) with states denoting managed state and/or compliance state. Alternatively or additionally, embodiments may be implemented where the identity management system 106 includes functionality for enforcing access policies based on device managed state and/or compliance state.

In some embodiments, a schema may be used for tracking device management state and device compliance state in an identity management service 106. The schema may be used when constructing messages to identify message types, compliance state, managed state, or other factors of interest.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
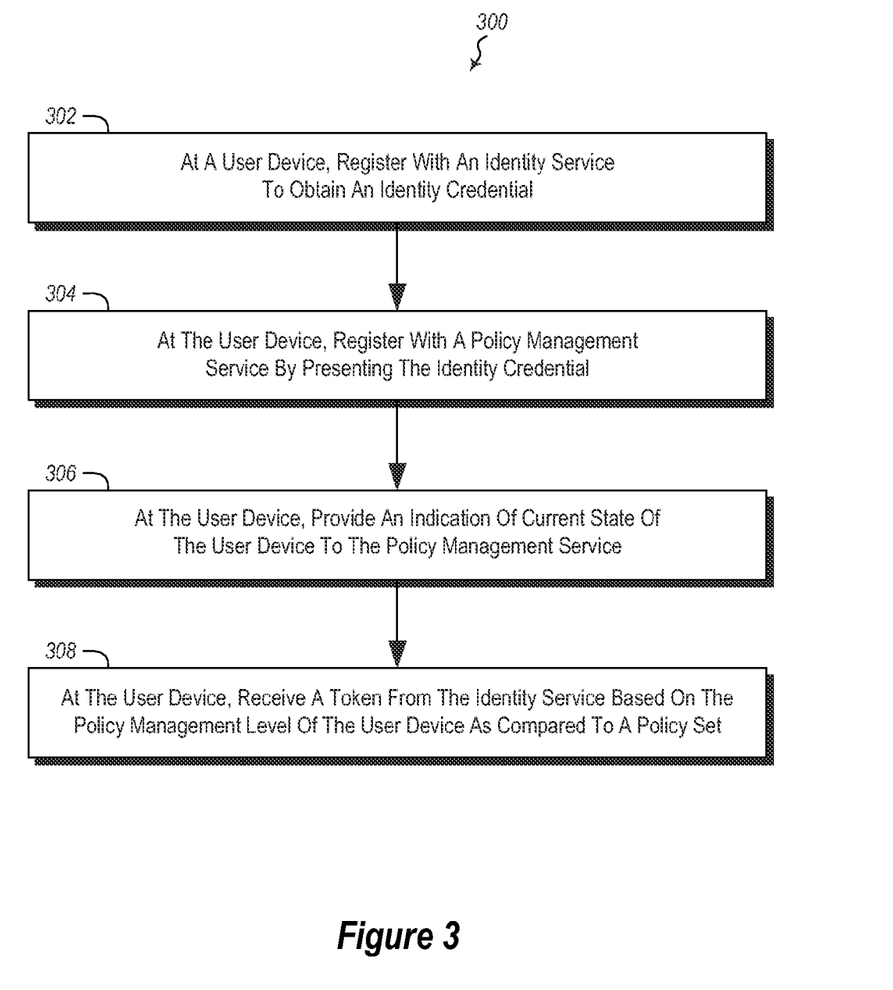
FIG. 3 illustrates a method of providing access to one or more resources to a user device.

Referring now to FIG. 3, a method 300 is illustrated. The method 300 may be practiced in a computing environment. The method 300 includes acts for providing access to one or more resources to a user device. One embodiment of the method 300 is illustrated in the depiction illustrated in FIG. 1. For example, the user device 102 may attempt to access resources at a service endpoint 110.

The method 300 includes at a user device, registering with an identity service to obtain an identity credential (act 302). For example, the user device 102 may register with the identity management service 106 to obtain an identity credential. The identity credential can be used to identify the device 102.

The method 300 further includes, at the user device, registering with a policy management service by presenting the identity credential (act 304). Thus for example, the identity credential obtained from the identity management service 106 can be presented to the policy management service 108.

The method 300 further includes, at the user device, providing an indication of current state of the user device to the policy management service (act 306). Thus, for example, the user device 102 can indicate to the policy management service 108 state of the device 102. Such state may be used to determine if the device 102 is in compliance with certain management policies.

The method 300 further includes, the user device receiving a token from the identity service based, on the policy management level of the user device as compared to a policy set (act 308). This is able to be performed, because the policy management service has provided an indication of compliance with management policies to the identity service by using the identity credential to correlate compliance with a device in the identity service.

The method 300 may further include, when the state complies with a policy set defined at the policy management service, receiving from the identity service a token with a claim that can be used for accessing a resource at a service endpoint. Thus, for example, the device 102 may receive the token 114 from the identity management service 106. The device can then use the token 114 to obtain resources from the service endpoint 110.

The method 300 may be practiced where receiving a token based on the compliance level of the user device as compared to the policy set includes receiving a token with a claim identifying the user device's compliance state. For example, the compliance state may be identified as in compliance, out of compliance, compliant with certain polices, raw state of the device, a state level where higher levels have higher security, etc.

The method 300 may be practiced where receiving a token based on the compliance level of the user device as compared to the policy set comprises receiving a token that does not include a compliance claim as the user device has state that is not in compliance with the policy set.

The method 300 may further include the user device presenting the token to a service endpoint to attempt to access a resource at the service endpoint. Thus for example, the user device 102 may present the token 114 to the service endpoint 110 to attempt to access resources at the service endpoint 110.

The method 300 may be practiced where the token indicates that the user device is managed by the policy management service. Thus, for example, the token 114 may include a claim in the token that indicates that the user device 102 is managed by the identity management service 106.

The method 300 may be practiced where compliance is evaluated at the policy management service based on at least one of a user state, a group state, a role state, an ip address, or a platform type (i.e. the type of operating system running on the device). Thus, for example, the policy management service 108 may make compliance decisions based on external factors. For example, if it can be determined that the user of the device 102 is the CEO of the company, the policy management service 108 can always indicate to the identity management service 106 that the device 102 is compliant no matter what the state of the device is. Or, more relaxed criteria may be used to determine that a device 102 is in compliance in such cases. Thus, compliance may be based on the identity of a user, a group to which a user belongs (e.g. a management group) a role (e.g. CEO), etc. In another embodiment, if the device 102 is communicating using an ip address indicating that the device is on a network deemed by the policy management service to be safe, then the device may be indicated to be compliant by the policy management service 108 to the identity management service 106, even though the device does not comply with certain policy specified state conditions. With regards to platform type, an example might be that there is an exemption rule that always blocks (or allows) devices that have a certain operating system on them.

The method 300 may be practiced where compliance claims allowing access to resources at a service endpoint are issued based on a token issuance policy. Thus, similar to the example illustrated above, the identity management service 106 itself can determine whether or not to issue claims in a token 114 based on factors such as user identity, user group, user role, and/or various other external factors. Thus, for example, the policy management service 108 may have indicated to the identity management service 106 that a device 102 is not compliant. However, the identity management service 106 may determine that the device 102 belongs to the CEO of the company and may therefor issue a claim in a token 114 anyway that allows the device 102 to access resources at the service endpoint 110. In some embodiments, members of certain user groups will be provided claims in tokens to allow them to obtain access resources. In sonic embodiments, this may be irrespective of compliance level. Alternatively, it may be with reduced compliance level requirements as compared to other user groups. Alternatively or additionally, claims may be provided in tokens based on certain external factors. For example, on some embodiments, a device 102 may be out of compliance but within a trusted IP address range. In some embodiments, this may be sufficient for an identity management service 106 to issue a token to the device.

In some embodiments, the method 300 may be performed where the issued token includes a compliance claim that expires. Compliance claims may be issued according to compliance state freshness criteria. This can be done to balance scalability and security. In particular, checking compliance on every access by the device 102 to the service endpoint 110 would require large amounts of resources. By checking compliance at some periodic rate, fewer resources may be needed. However, there is a possibility that an out of compliance device may be able to access the resources at the service endpoint 110.

The method 300 may be practiced where the identity service determines that the user device is not compliant and initiates a remediation. For example, in some embodiments, remediation may include redirecting the device 102 to the policy management service 108 where the policy management service 108 can guide the user to perform actions to place the device 102 into compliance. Alternatively, the policy management service may provide state or a script that can be applied at the device 102 to put the device 102 into compliance. In an alternative embodiment, the identity management service 106 could have information that allows the identity management service 106 to facilitate remediation directly. For example, the identity management service 106 could obtain information from the policy management service 108 and then could direct the user of the device 102 what to do to put the device 102 into compliance or to provide state or scripts to the device 102 to put the device 102 into compliance.

Figure 4:
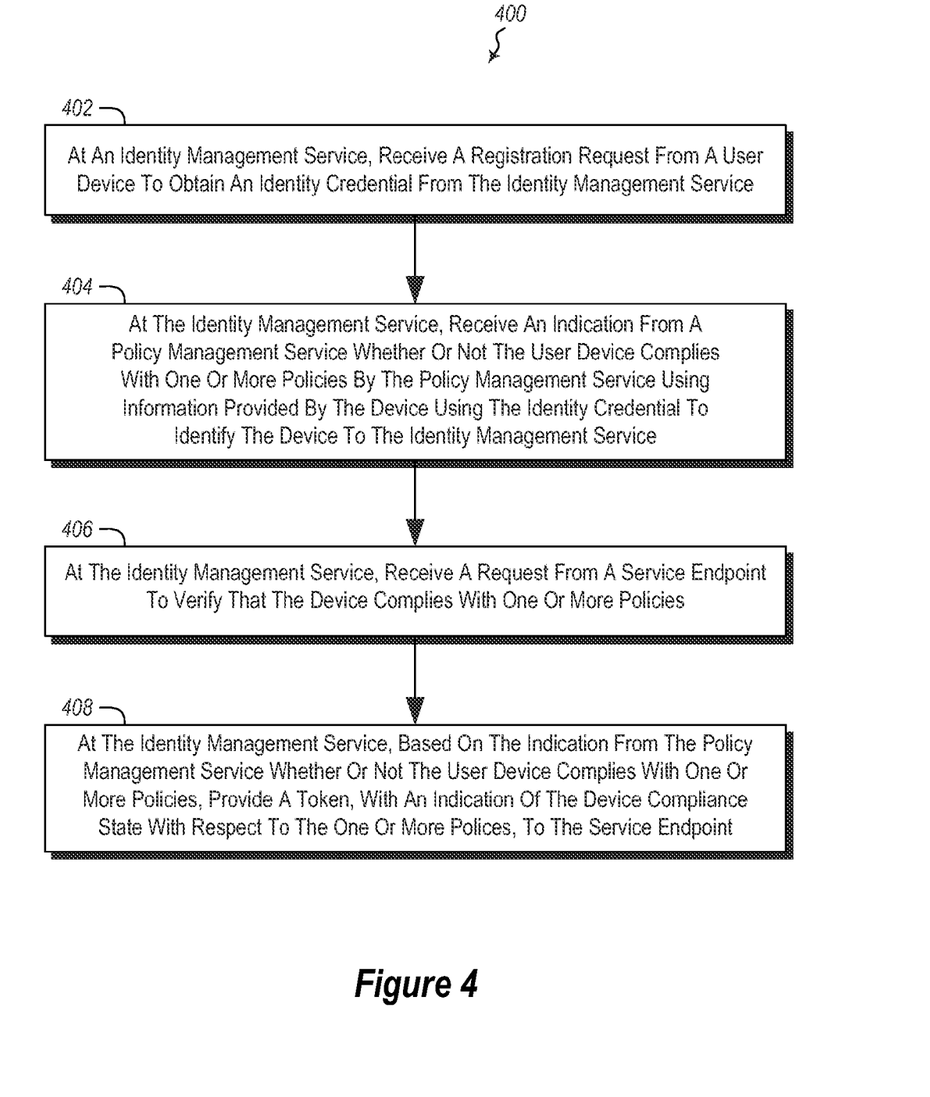
FIG. 4 illustrates another method of providing access to one or more resources to a user device.

Referring now to FIG. 4, a method 400 is illustrated. The method 400 may be practiced in a computing environment. The method 400 includes acts for providing access to one or more resources to a user device. An example of the method 400 is illustrated in FIG. 2 described above.

The method 400 includes, at an identity management service, receiving a registration request from a user device to obtain an identity credential from the identity management service (act 402). Thus, for example, the identity management service 106 may receive a request from a user device 102 for an identity credential.

The method 400 further includes, at the identity management service, receiving an indication from a policy management service whether or not the user device complies with one or more policies by the policy management service using information provided by the device using the identity credential to identify the device to the identity management service (act 404). For example, the device 102 may present the identity credential to the policy management service 108. The policy management service 108 can determine that the device complies with certain policies. The policy management service 108 can then provide an indication to the identity management service 106 that the device 102 complies with the policies.

The method 400 further includes, at the identity management service, receiving a request from a service endpoint to verify that the device complies with one or more policies (act 406). For example, the device 102 may request resources from the service endpoint 110. The service endpoint 110 can query the identity management service 106 directly for the token 114 including device claims for the device 102 indicating that the device 102 is in compliance with certain policies.

The method 400 further includes, at the identity management service, based on the indication from the policy management service whether or not the user device complies with one or more policies, providing a token, with an indication of the device compliance state with respect to the one or more polices, to the service endpoint (act 408). The identity management service 106 can provide the token 114 with compliance claims directly to the service endpoint 110, when can then provide resources to the device 102 based on the token 114 and the compliance claims.

The method 400 may further include, when the state complies with a policy set defined at the policy management service, the identity service providing a token with a claim indicating that the device complies with the one or more policies.

The method 400 may be practiced where the token includes a claim indicating the compliance level of the user device with respect to policy.

The method 400 may be practiced where the token does not include a compliance claim as the user device has state that is not in compliance with policy.

The method 400 may be practiced where the token indicates that the user device is managed by the policy management service.

The method 400 may be practiced where compliance claims allowing access to resources at a service endpoint are issued based on a token issuance policy.

The method 400 may be practiced where the issued token includes a compliance claim that expires.

The method 400 may be practiced where the identity service determines that the user device is not compliant and initiates a remediation.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, solid state storage devices, etc, which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include: Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of providing access to one or more resources to a user device, the method comprising:
   at a user device, registering with an identity service to obtain an identity credential which omits a claim that the user device is a managed device;
   the user device sending the identity credential to a service endpoint where it is determined that the identity credential omits the claim that the user device is a managed device;
   at the user device, registering with a policy management service by at least presenting the identity credential to the policy management service, the user device registering with the policy management service in response to the user device being redirected to the policy management service from the service endpoint in response to the user device presenting the identity credential to the service endpoint that was determined to omit the claim that the user device is a managed device;
   at the user device, receiving a compliance policy listing corresponding to a compliance policy required for managed devices, the compliance policy listing identifying one or more items of interest, the one or more items of interest including at least (a) one or more changes to be made at the user device for the user device to be compliant with the compliance policy or (b) one or more states of the user device required for compliance;
   at the user device, performing at least one of providing a notification to the policy management service that indicates (a) the one or more states of the user device required for compliance or (b) the user device taking a remedial action that includes the one or more changes required for the user device to be compliant, wherein the notification triggers the transmission of a compliance state setting to the identity service;
   at the user device, receiving a token from the identity service that indicates a compliance state of the user device and a claim that the user device is a managed device, the token being based on the identity service receiving the compliance state setting from the policy management service; and
   the user device transmitting the token to the service endpoint with the claim that the user device is a managed device.

2. The method of claim 1, further comprising providing a user of the user device information about compliance violations and information on how to remediate the compliance violations.

3. The method of claim 1, wherein the token further includes a level of compliance.

4. The method of claim 1, wherein the compliance policy listing includes a requirement that a password of the user device be of a certain length.

5. The method of claim 1, wherein the compliance policy listing includes a requirement that the user device requires a character pin in use on the user device.

6. The method of claim 1, wherein the policy management service indicates a security level of the user device, the security level indicating at least one of a level of encryption, a strength of a password, or a jail-broken status of the user device.

7. The method of claim 1, wherein the compliance policy listing includes one of a user state, a group state, a role state, an ip address, or a platform state.

8. The method of claim 1, wherein compliance claims allowing access to resources at a service endpoint are issued based on a token issuance policy.

9. The method of claim 1, wherein the token further includes a compliance claim that expires.

10. The method of claim 1, wherein the remedial action includes redirecting the user device to the policy management service where the policy management service then guides a user of the user device to perform actions to place the user device into a compliant state.

11. A computer system, comprising:
    one or more hardware processors; and
    one or more computer-readable hardware storage devices having stored thereon computer-executable instructions that are executable by the one or more hardware processors to cause the computer system to provide access to one or more computing resources, and further to cause the computer system to perform the following:

register with an identity service to obtain an identity credential which omits a claim that the computer system is a managed system;

send the identify credential to a service endpoint where it is determined that the identity credential omits the claim that the computer system is a managed system;

register with a policy management service by at least presenting the identity credential to the policy management service, the computer system registering with the policy management service in response to the computer system being redirected to the policy management service from the service endpoint in response to the computer system presenting the identity credential to the service endpoint that was determined to omit the claim that the computer system is a managed system;

receive a compliance policy listing corresponding to a compliance policy required for managed systems, the compliance policy listing identifying one or more items of interest, the one or more items of interest including at least (a) one or more changes to be made at the computer system for the computer system to be compliant with the compliance policy or (b) one or more states of the computer system required for compliance;

perform at least one of providing a notification to the policy management service that indicates (a) the one or more states of the computer system required for compliance or (b) the computer system taking a remedial action that includes the one or more changes required for the computer system to be compliant, wherein the notification triggers the transmission of a compliance state setting to the identity service;

receive a token from the identity service that indicates a compliance state of the computer system and a claim that the computer system is a managed system, the token being based on the identity service receiving the compliance state setting from the policy management service; and transmit the token to the service endpoint with the claim that the computer system is a managed system.

12. The computer system of claim 11, wherein the computer-executable instructions further cause the computer system to provide a user of the computer system information about compliance violations and information on how to remediate the compliance violations.

13. The computer system of claim 11, wherein the token further includes a level of compliance.

14. The computer system of claim 11, wherein the compliance policy listing includes a requirement that a password of the computer system be of a certain length.

15. The computer system of claim 11, wherein the compliance policy listing includes a requirement that the computer system requires a character pin in use on the computer system.

16. The computer system of claim 11, wherein the policy management service indicates a security level of the computer system, the security level indicating at least one of a level of encryption, a strength of a password, or a jail-broken status of the computer system.

17. The computer system of claim 11, wherein the compliance policy listing includes one of a user state, a group state, a role state, an ip address, or a platform state.

18. The computer system of claim 11, wherein the token further includes a compliance claim that expires.

19. The computer system of claim 11, wherein the remedial action includes redirecting the computer system to the policy management service where the policy management service then guides a user of the computer system to perform actions to place the computer system into a compliant state.

20. One or more hardware storage devices having thereon computer-executable instructions that are executable by one or more hardware processors of a computing system to cause the computing system to provide access to one or more computing resources by at least causing the computing system to perform:

register with an identity service to obtain an identity credential which omits a claim that the computing system is a managed system;

send the identify credential to a service endpoint where it is determined that the identity credential omits the claim that the computing system is a managed system;

register with a policy management service by at least presenting the identity credential to the policy management service, the computing system registering with the policy management service in response to the computing system being redirected to the policy management service from the service endpoint in response to the computing system presenting the identity credential to the service endpoint that was determined to omit the claim that the computing system is a managed system;

receive a compliance policy listing corresponding to a compliance policy required for managed systems, the compliance policy listing identifying one or more items of interest, the one or more items of interest including at least (a) one or more changes to be made at the computing system for the computing system to be compliant with the compliance policy or (b) one or more states of the computing system required for compliance;

perform at least one of providing a notification to the policy management service that indicates (a) the one or more states of the computing system required for compliance or (b) the computing system taking a remedial action that includes the one or more changes required for the computing system to be compliant, wherein the notification triggers the transmission of a compliance state setting to the identity service;

receive a token from the identity service that indicates a compliance state of the computing system and a claim that the computing system is a managed system, the token being based on the identity service receiving the compliance state setting from the policy management service; and transmit the token to the service endpoint with the claim that the computing system is a managed system.

* * * * *